July 2, 1946.  J. W. FULTON  2,403,070
FILAMENT JOINT FOR ELECTRIC LAMPS OR SIMILAR DEVICES
Filed March 1, 1945
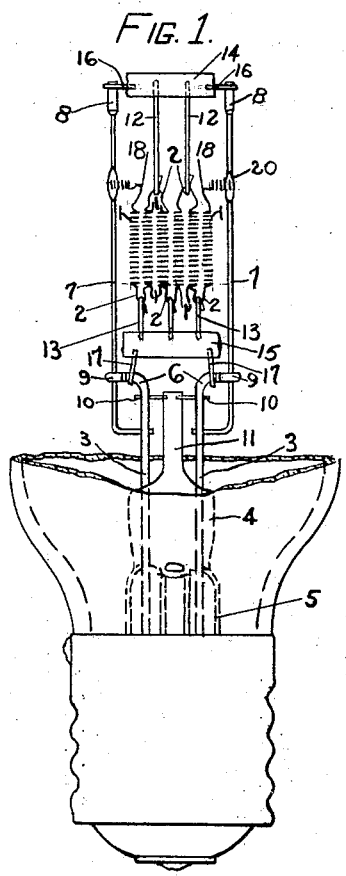
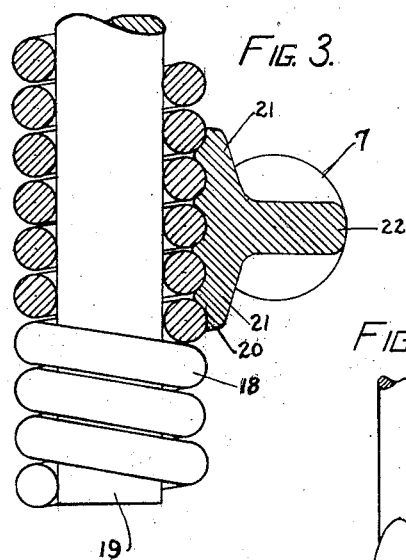
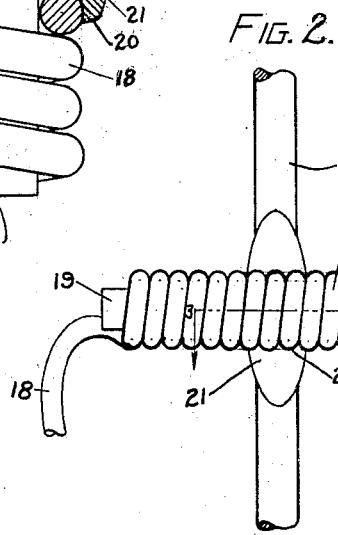
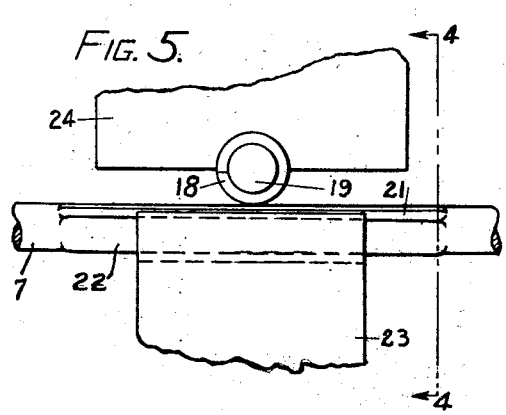
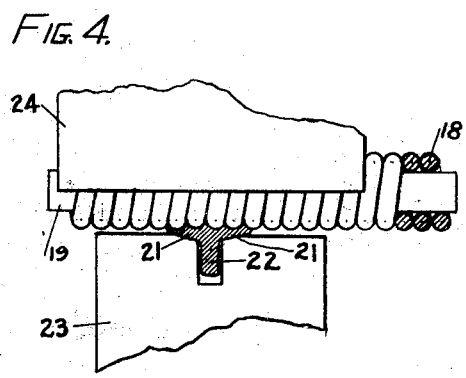
INVENTOR
JOHN W. FULTON
By John H. Anderson
HIS ATTORNEY Patented July 2, 1946

2,403,070

UNITED STATES PATENT OFFICE 2,403,070

FILAMENT JOINT FOR ELECTRIC LAMPS OR SIMILAR DEVICES

John W. Fulton, Wickliffe, Ohio, assignor to General Electric Company, a corporation of New York Application March 1, 1945, Serial No. 580,316

4 Claims. (Cl. 176—38)

This invention relates to filament joints, or supports and current connections, for filaments for electric lamps or similar devices. The filament mount shown and described herein is of a concentrated monoplane coil type; but the invention is not limited to any particular type of mount. The invention is here illustrated and explained as embodied in supports which also serve as current connections for the filament.

In filament mounts of various types, the filament or its direct support or connector is secured to supporting members of the mount which sustain a certain amount of stress, at least part of which may from time to time be exerted transversely of such supporting members. This attachment is usually made by methods that involve considerable heat, such as welding. In order to withstand the heat to which they are exposed during the operation of the lamp, such supporting members are often made of metal which becomes very brittle where it is thus heated, such as tungsten or molybdenum, for example. The heat also tends to embrittle the filament at the weld. Owing to its embrittlement as described, the supporting member becomes so weak that it may fail under the transverse or other stresses to which it is subjected. Sometimes such a supporting member snaps under stresses created by the mere inertia of the supporting structure when the lamp is subjected to a bump, either in service or during manufacture.

In the cases just mentioned, as also in other cases, the weld is made laterally to a round member, giving rise to various disadvantages.

As explained more fully hereinafter, I have overcome the difficulty of support embrittlement by making the supporting member of such cross-section (at least at the weld) that the welding heat only affects and embrittles part of the section, leaving another portion with sufficient toughness and strength to withstand the transverse stresses without damage to the member. For this purpose, the member may include a flat, suitably wide portion at an edge of which is the part to which the weld is made, preferably to another flat portion of the member at said edge. To increase the resistance of the member under the transverse stress, the first-mentioned flat or wide portion or section of the member may be arranged in the plane of the transverse stress. Various angle-sections are suitable, such as a simple angle, a channel, or a T.

I have also overcome the difficulties incident to welding laterally to a round member.

Various features and advantages of the invention will appear from the description of a species or form of embodiment, or from the drawing.

In the drawing, Fig. 1 is a side view of a filament mount for an incandescent lamp conveniently embodying the invention, portions of the lamp bulb being also shown; and Fig. 2 is a similar view of a filament connection shown in Fig. 1, on a larger scale.

Fig. 3 shows a cross-section of a supporting member or side rod of the mount shown in Fig. 1 with portions of the associated filament and support or connector, the section being taken as indicated by the line and arrows 3—3 in Fig. 2, but on a larger scale and turned 90° from the Fig. 2 positions of the parts.

Fig. 4 is a side view corresponding to Fig. 3 illustrating the making of the weld and showing the welding electrodes in working relation to the parts to be welded; and Fig. 5 is a similar view at right angles to Fig. 4.

The mount here illustrated is that of a projection lamp of moderately low wattage, comprising a filament of tungsten wire coiled in a number of upright sections 1 that are interconnected by intermediate uncoiled U-portions or bights 2. The coils 1 are shown as lying all in one plane, though this is not essential. The supporting structure of the mount comprises lead wires 3, 3 sealed through the press portion 4 of a stem 5 of the lamp envelope. The leads 3, 3 are shown as bent outward at 6, 6. Long upright side extensions 7, 7 of the leads 3, 3 lie opposite and above and below the filament coils 1, and may consist of refractory metal like molybdenum. As here shown, the supporting members 7, 7 have top end portions 8, 8 of ordinary metal like nickel, butt-welded to the ends of the molybdenum. The lower ends of the rod-like supporting members 7, 7 may be bent inward and welded to the upright portions of the leads 3, 3 and the outbent lead portions 6, 6 may have their ends bent into hooks 9, 9 which grip around or clamp the rods 7, 7. The supporting structure may be additionally braced relative to the lamp stem 5 by means of transverse wires 10, 10 sealed into the stem (or its inward extension or arbor 11) and attached to the side supports, as by welding each of said wires 10 to a lead 3 between its two points of attachment to the corresponding side member 7.

For engaging and holding the filament bights 2, there are upper and lower (molybdenum) wire hooks 12, 13 whose ends are fused into the sides of upper and lower vitreous cross-bars or bridge-rods 14, 15. The upper bar 14 is supported by wires 16, 16 fused into its ends and welded to the end portions 8, 8 of the supporting members 7, 7, and the lower bar 15 is supported by wires 17, 17 fused into its lower side near its ends and welded to the lower lead portions 6, 6.

The filament is electrically connected to each lead extension 7 and additionally supported therefrom by means of supporting end portion 18 of the filament, preferably with the aid of another support 19 associated with said end portion 18, Fig. 2. For this purpose, the filament end 18 may be coiled around and welded to the support 19, which is itself welded to the member 7 at 20. To assure that the portion of the filament that takes the stresses and strains shall be free of embrittlement due to welding, the coiled filament end 18 is welded to the support 19 remote from where the filament parts company with the latter, preferably by inclusion in the same weld 20 that attaches the part 19 to the member 7.

In manufacture, the filament wire may be coiled up and bent into the several sections 1, ends 18, and bights 2 before placing the filament on the supporting hooks 12, 13, and the spud-like supports 19 may be inserted in the end coils 18 before welding these spuds to the members 7. To assure definite contact of the coil 18 with each spud 19 and a definite length of filament in circuit between the spuds, the coil 18 may be coiled to an internal size slightly smaller than the spud 19, so as to elastically grip the whole length of the latter in the coil.

As thus far described, the construction corresponds to that heretofore known, which has been subject to the above-mentioned drawbacks arising from embrittlement of each member 7 at its weld 20. The inertia of the upper bar or bridge 14 is especially a factor in putting a strain on the brittle side rod area at 20 when the lamp is subjected to a bump.

In accordance with my invention, I obviate these drawbacks by a cross-section of the member 7 which affords a substantial portion sufficiently remote from the weld not to be greatly heated when the weld is made, so that this portion remains largely or substantially unembrittled. I overcome the drawbacks of welding to a round member by laterally flattening the round member 7, locally, where the weld is made. As shown in Figs. 1, 2 and 3, the member 7 consists of a round rod or wire which is deformed into a T-section at and adjacent the weld 20, which involves only the flanges forming the top 21 of the T, and is made at the outer flat side of this portion 21. Thus the flange 22 forming the shank of the T in Fig. 3 is substantially unaffected by the welding heat, and is unembrittled, so that it offers ample resistance to transverse stresses which might otherwise tend to snap off the member 7 at the weld 20, whether during manufacture, shipment, or use of the lamp. Accordingly, the rod 7 can bend at the weld 20 without breaking, if the rod should be overstressed. As shown, this flange 22 is relatively thick as compared with the top flanges 21, 21 and extends in the plane of transverse stress perpendicular to the common plane of the filament lengths 1 and of the members 7, 7, thus affording ample unembrittled strength. However, the flanges 21, 21, 22 are all shown relatively thin as compared with the general thickness of the rod 7.

In making a weld 20 as illustrated in Figs. 3 and 4, the side rod flange 22 may be accommodated in a slot of a welding electrode 23 which bears laterally against the top flanges 21, 21 at either side of the flange 22, but has clearance around and behind said flange 22. The coiled filament end 18 (with the support 19 already inserted therein) may be engaged in a conformative semi-circular depression of a coacting welding electrode 24. As shown, the parts 18, 19 extend cross-wise of the member 7, at right angles thereto. When welding current is passed and the electrodes 23, 24 are pressed toward one another, in accordance with usual spot-welding practice in the electric lamp art, the portion 21 of the member 7 is heated and softened, as well as the filament coil 18 and the member 19, and the parts are thus united and electrically connected. The filament convolutions 18 may be embedded in the support portion 21, and even the member 19. However, the portion 22 of the member 7 does not make contact with the electrode 23, and so receives no direct heat; therefore it remains relatively cool and retains its toughness and ductility. Indeed, this part 22 is effectively protected against heating by the bearings of the electrode 23 on the flanges 21, 21 at either side, which determine the path of heating current flow through these flanges and conduct away the heat from them.

While any suitable metals may be used for the welding electrodes 23, 24, the best combination seems to be one in which each electrode is of the material which is in contact with it during the welding: e. g., molybdenum for the side-rod engaging electrode 23, and tungsten for the filament-engaging electrode 24. Such electrodes will operate satisfactorily for the welding of some hundreds of joints before their acting ends need reshaping.

It will be seen that while the area of molybdenum to which the filament 1 is welded is made brittle to about the same degree as in prior practice, the flat surface at 21 to which the filament coil 18 is laterally welded is considerably larger than the area of round rod to which the filament is welded in ordinary practice, so that the total strength of the joint is enough to keep the filament from breaking loose. Moreover, the flat surface at 21 does not tend to spread apart the brittle filament convolutions and break them when the parts are pressed together during welding, as the round rod surface does in ordinary practice. On the contrary, the weld includes several turns of the filament coil all laterally adherent to the flat surface at 21. The thin molybdenum section distorts somewhat during welding, which affords an indication of the depth of fusion of the part 21 during welding; whereas a weld to a round rod affords no such indication. Furthermore, the weld can be made just as well for any angle between the side rod 7 and the spud 19 and coil 18, as seen in Fig. 2, within a considerable range of variation; whereas in welding to a round rod, the spud tends to assume an angle corresponding to the pitch of the coil. This latitude takes care of variations in the angle of coil 18 to coils 1 without any tendency to bending or straining the filament between the coils 1 and 18. In making the welds, the electrode 23 may be allowed to rotate about its own vertical axis, so as to accommodate itself to whatever the angle of the parts 7, 18, 19 may happen to be in each particular case.

What I claim as new and desire to secure by Letters Patent of the United States is:

1. In a filament mount, the combination of a supporting upright that is subject to transverse stress and is embrittled by welding, said upright embodying an intermediate portion that is thin and wide in a plane of transverse stress and has a welding portion extending laterally from an edge of the wide portion, and a filament support welded to the side of said laterally extending welding portion.

2. In a filament mount, the combination of a supporting rod that is subject to transverse stress and is embrittled by welding, said rod having an intermediate portion deformed into an angle section embodying a flange in a plane of transverse stress and a flange extending cross-wise of the first-mentioned flange, and a filament support welded to the side of the last-mentioned flange which is remote from the first-mentioned flange.

3. A filament joint for electric lamps and similar devices comprising a supporting rod of ductile metal which is embrittled by welding, said rod having a localized portion deformed into a T-shaped cross-section, and a metallic filament having an end portion extending transversely of the rod across the head of said T-shaped portion and welded thereto, the stem of said T-shaped portion being comparatively ductile.

4. In a filament connection, the combination with a round support rod laterally flattened locally, of a multi-turn wire coil extending across the surface of the locally flattened portion of said rod at an angle to the rod and having the sides of its convolutions welded to said surface.

JOHN W. FULTON.